T. WILSON.
Seed Planter and Cultivator.
No. 97,467.
3 Sheets—Sheet 2.
Patented Nov. 30, 1869.
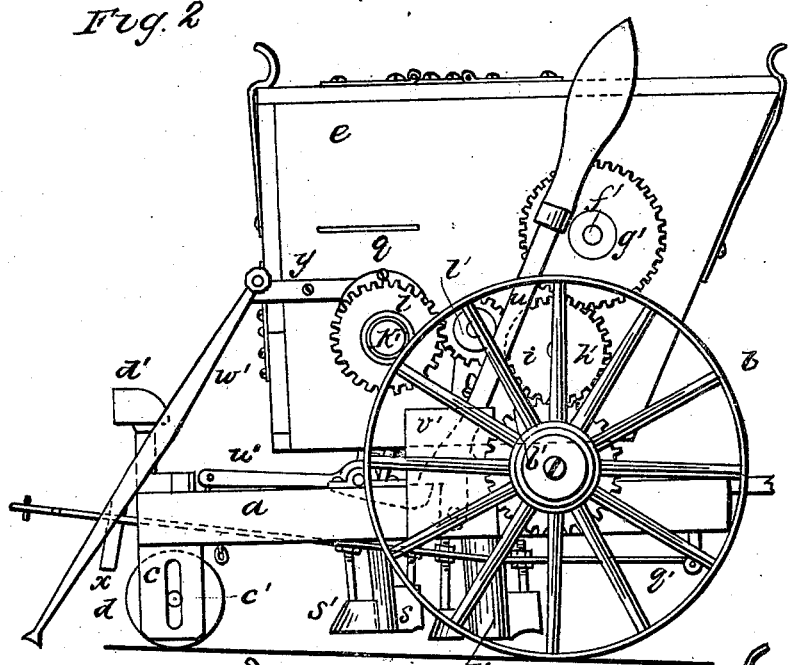
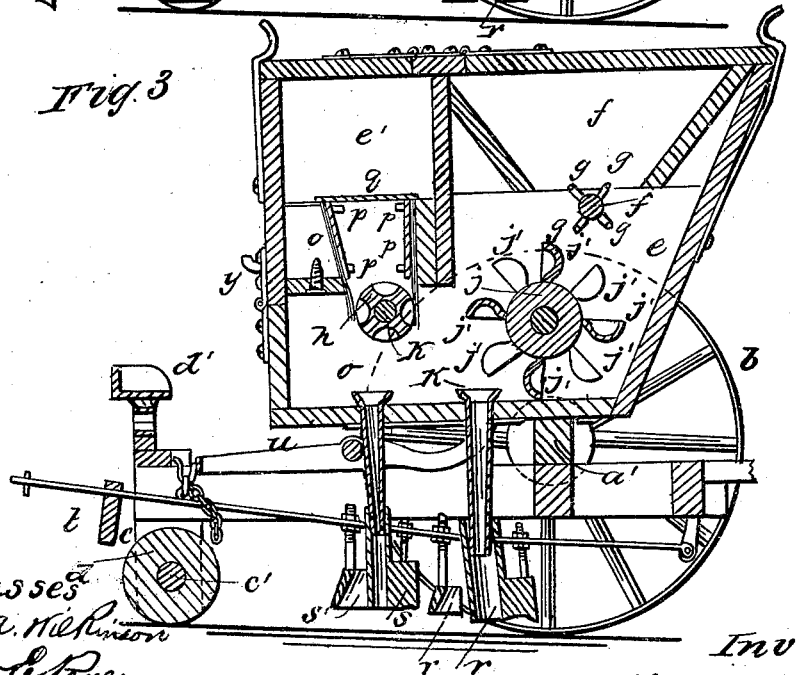

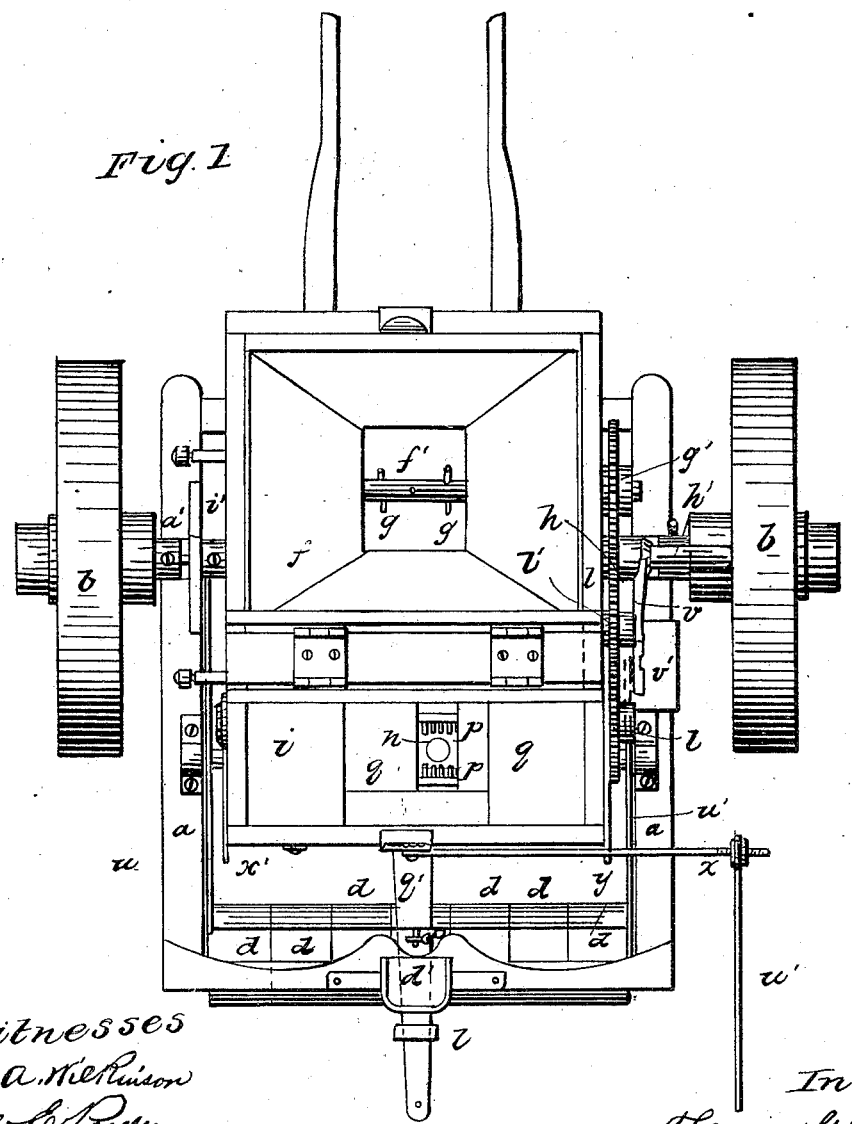

T. WILSON.
Seed Planter and Cultivator.

No. 97,467.

3 Sheets—Sheet 3.

Patented Nov. 30, 1869.

UNITED STATES PATENT OFFICE.

THOMAS WILSON, OF GARTON, COUNTY OF YORK, ENGLAND.

IMPROVEMENT IN COMBINED PLANTER AND CULTIVATOR.

Specification forming part of Letters Patent No. 97,467, dated November 30, 1869.

*To all whom it may concern:*

Be it known that I, THOMAS WILSON, of Garton, Yorkshire, England, have invented new and useful Improvements in a Cultivator, Fertilizer, and Planter Combined; and I do hereby declare that the following is a full and exact description thereof, reference being had to the accompanying drawings, and to the letters of reference marked thereon.

The nature of my invention consists in providing a machine that will cultivate, parcel out, and distribute all kinds of fertilizer and plant all kinds of seed in one or more rows of hills or drills at one operation, as hereinafter described.

It also relates to the planting device, whereby the same can be easily and quickly adjusted so as to plant any and all kinds of seed.

Furthermore, it relates to the arrangement of devices for throwing out of gear the cultivator, fertilizer, and planter when required to transport the machine to or from its work.

To enable others skilled in the art to make and use my invention, I will proceed to describe its construction and operation.

Figure 1 represents a plan of my improved fertilizer, cultivator, and planter combined. Fig. 2 represents a side elevation of the same. Fig. 3 represents a vertical section of the same, showing its operation. Fig. 4 represents a side elevation, showing the dropping device. Fig. 5 represents an end view of the back part of the machine, showing the planting device. Fig. 6 represents a plan of the fertilizer. Fig. 7 represents a side elevation of the device for throwing out of gear the fertilizer, cultivator, and planter.

Similar letters in the different figures indicate corresponding parts.

$a$ represents the frame, to which is firmly secured the axle $a'$, which is provided with wide rim-wheels $b\ b$. Attached to the hub of one, on its inside, is the driving-gear $b'$. This gear, when the machine is at work, imparts motion throughout the working parts of the same. The front part of the frame $a$ is provided with a shaft or pole, as the case may require, which is firmly secured to the same. To the back part of the frame $a$, on each side, are firmly attached suitable stands, $c\ c$, which are provided with slotted bearings, in which the shaft $c'$ revolves. Between these stands $c\ c$, and located on the shaft $c'$, are the required number of rolls $d\ d$, their object being to balance the machine and act as a finisher to the devices that precede it, the object of slotting the stands $c\ c$ being to allow the rolls $d\ d$ to pass over uneven rough land, stones, &c., without raising or disturbing the machine with its contents; also, located at the back part of the frame $a$, near its center, is the seat $d'$, mounted on a spring or springs, for the operator's use, which, being in the rear of the working parts of the machine, allows him to see if each device is doing its required work.

Located on the top of the frame $a$, and secured to the same by slotted bearings, is the body $e$ of the machine, its inside being divided into two parts or receptacles, each of which is supplied with troughs or hoppers $e'$ and $f$, the front part of the body $e$ being designed for the fertilizing material, the back part for the seed. The top part of this body $e$ is provided with covers, whereby the seed and fertilizer may be kept separate and distinct and in no danger of mixing while the machine is in operation.

Located just below the trough $f$ is the shaft $f'$, which is furnished with the requisite bearings, they being secured to the sides of the body $e$, this shaft $f'$ being provided with pins $g\ g$, directly in under the trough $f$, the object of this device being to keep the fertilizing material properly stirred up loosely.

Attached and secured firmly to the end of the shaft $f'$ is the gear $g'$, which connects and meshes into the gear $h$, which is firmly secured to the shaft $h'$ and located on the outside of the body $e$. This shaft $h'$ is further provided with suitable bearings, which are secured to the sides of the body $e$. Attached to this shaft at the driven end is the gear $i$, which connects and gears into the driving-gear $b'$. At the other end of this shaft $h'$ is secured the cam $i'$.

Located and secured firmly to the shaft $h'$, directly in under the pins $g\ g$ on the shaft $f'$, is the cylinder $j$, which is furnished with buckets or scoops $j'\ j'$, they being properly secured to the same, and of the required size, shape, and distance apart, which conveys the fertilizer to the spout or conveyer $k$.

$k'$ is a shaft which passes through the body $e$, having the required bearings provided, they being secured to the sides, one end of this shaft projecting through sufficiently to receive and secure the gear $l$, which connects with the gear $h$ by the intermediate gear, $l'$, which is adjustable.

Secured to the shaft $k'$ are the cylinders $m\ m'$ and $n\ n'\ n'$, as seen in Fig. 5, they being constructed in different thicknesses and shapes to plant different kinds of seed, as may be required, and are so arranged that either one may be removed from the shaft $k'$ and replaced on the same directly in under the trough $e'$, from which the seed is dropped into the spout $o$.

On the front and back of these cylinders $m\ m'$ and $n\ n'$ are the adjustable sweeps and clearers $o'$, which prevent, without bruising, the seed from passing by the cylinder when not required. These adjustable sweeps $o'$ are divided off and supplied with pins $p\ p$, between which the slides $p'\ p'$ pass, which, with the assistance of the slides $q\ q$, prevent the seed from coming in contact with but the cylinder desired, as shown in Fig. 5, planting or dropping but from one at a time.

Hinging in under and to the front part of the frame $a$ is the plow-beam $q'$, which extends the entire length and projects from the back part of the frame $a$.

$v$ is the adjustable cultivator, which is provided with a hollow stem, into which the spout $k$ passes, thus conveying the fertilizer as required.

$v'$ is an adjustable coverer secured to the beam directly in the rear of the cultivator $v$.

Secured to the beam $q'$ directly in under the spout $o$ is the adjustable planter $s$, which is provided with a hollow stem, into which the spout $o$ passes, through both of which the seed passes from the cylinders $m\ m'$ and $n\ n'$. Located directly behind this planter $s$, and secured to the beam $q'$, is the adjustable seed-coverer $s'$. Sliding on this beam $q'$, between the coverer $s'$ and its end, is the weight $t$, which serves to keep and force the planter $s$ and cultivator $v$ into the soil as desired. This beam $q'$ connects with the double beam $u$ and $u'$ in its center by a chain or its equivalent device, both beams, $u$ and $u'$, being provided with bearings which are secured to the top of the frame $a$, the beam $u$ being so constructed at its end as to be operated upon by the cam $i'$, which cam being constructed so as to operate the cultivator $v$ and planter $s$ as desired. The beam $u'$ coming in contact with the lever $v$, which is provided with a suitable bearing and operating in the slotted stand $v'$, whereby when the lever $v$ is brought toward the back of the machine will throw the cultivator and planter $v$ and $s$ up and out of the way, at the same time lifting up the geared side of the machine, throwing or disconnecting the gear $i$ from the driving-gear $b'$, where it is held by the catch $w$, as shown in Figs. 1 and 7.

$w'$ is an adjustable marker, which is secured to the arm $x$, being pivoted at the center, allowing the same to be reversed from one side of the machine to the other and held in position by the rests $x'$ and $y$, the object of this marker being to enable the operator to guide the machine true, making the rows of hills or drills at an equal distance apart.

The machine, being thus constructed and its several parts adjusted in position, is then ready for use. The fertilizing material and seed to be used are placed into their respective designed troughs or hoppers $f$ and $e'$ and secured by their covers. The adjustable marker $w'$ is set as required. The machine is then set in motion, imparting action through the different gears, thus operating all the devices as follows: For planting in hills the cultivator $r$ is forced into the soil by aid of the weight $t$, immediately and instantly after which the fertilizing material is deposited from the hopper or trough $f$ by aid of the scoops $j'\ j'$ into and through the spout $k$ and hollow stem of the cultivator $r$ into the place previously made. Almost simultaneously with this operation the coverer $r'$ covers the fertilizer over. The planter $s$, being so adjusted as to leave a sufficient covering of loam over the fertilizer, next plows into and through the same hill. At the same time the seed is conveyed from the hopper $e'$ by the cylinder $n$ into and through the spout $o$ and hollow stem of the planter $s$, where it drops into the hill thus made, which is instantly covered by the coverer $s'$. Quickly following these operations the plow-beam $q'$ is instantly raised by the action of the cam $i'$ on the beam $u$, this cam $i'$ being so constructed as to give any required distance between the hills as may be desired. This beam $q'$, after leaving the cam $i'$, drops into its former position, allowing the fertilizer $r$ and planter $s$, with their coverers $r'$ and $s'$, to resume their former operation again, and so on throughout the entire length of the field, the finishing stroke of the hills being made by the series of rollers $d\ d$, which completely, neatly, and finally finish the same. The operator then, by aid of the lever $v$, disengages the entire working parts of the machine, which converts it into a two-wheeled carriage for the time being, turns the machine entirely around, reversing the marker $w'$ on the other side of the machine. Then the wheel opposite the marker $w'$ follows the line or mark last previously made. The lever $v$ is then reversed, connecting the gearing, and the same operation and result follows as before. If the seed is desired to be deposited in drills instead of hills, the cam $i'$ is removed and the cylinder $n'$ is placed or arranged on the shaft $k$, so as to deposit the seed continuous instead of at intervals, as before described. Also the same change in the fertilizing-cylinder $j$ is made. When it is required to plant more than one row of hills at one operation two or more plow-beams, $q'$, are substituted, with its cultivator $r$, planter $s$, and coverers $r'$ and $s'$, they being placed in a zigzag position on the beams $q'$ and their attendant devices. When the machine is thus arranged to be used it equalizes the draft of the same on the animals, as but one beam $q'$ operates at a time, leaving the hills parallel with each other.

What I claim as my invention, and desire to secure by Letters Patent, is—

1. The adjustable cultivator $r$, planter $s$, and coverers $r'$ and $s'$, when arranged as and for the purposes described.

2. The cam $i'$, in combination with the lever $u'$, for the purposes specified.

3. The lever $v$, for the purposes as herein described.

4. The adjustable slides $q\,q$ and $p'\,p'$, in combination with the sweeps $o'\,o'$, for the purposes as described.

5. In combination with the planters, the cylinders $m\,m'$ and $n\,n'$, all when arranged and combined as described.

6. In combination with the cultivator $r$ and coverer $r'$, the shaft $f'$, with pins $g\,g'$, and the scoops $j\,j$, with spout $k$, combined and arranged as described.

THOMAS WILSON.

Witnesses:
F. A. WILKINSON,
GEO. E. PEVEY.